XR 3,504,307 213

March 31, 1970 I. L. GELLES 3,504,307

CROSS-REFERENCE

THIN SAMPLE ULTRASONIC DELAY LINE

Filed July 6, 1966

INVENTOR.
ISADORE L. GELLES
BY
Kenway, Jenney & Hildreth
ATTORNEYS

3504307
OR IN 333/30R

United States Patent Office 3,504,307
Patented Mar. 31, 1970

3,504,307

THIN SAMPLE ULTRASONIC DELAY LINE

Isadore L. Gelles, Acton, Mass., assignor to Kennecott Copper Corporation, New York, N.Y., a corporation of New York Filed July 6, 1966, Ser. No. 563,194
Int. Cl. H03h 7/30
U.S. Cl. 333—30 8 Claims

ABSTRACT OF THE DISCLOSURE

The apparatus disclosed herein employs a delay line which is characterized by a normalized thickness times frequency product in the order of 0.1 or less so that ultrasonic energy coupled thereto is transmitted only in the desired mode thereby to preserve the fidelity of the transmitted impulses.

Figure 1A:
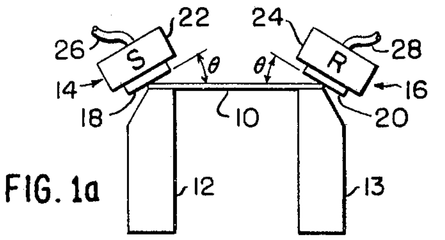

My invention relates to ultrasonic delay line. In particular, it relates to improved ultrasonic delay lines for the transmission of high freqeuncy signals in the megacycle range.

Ultrasonic delay lines are useful devices which find application in a variety of fields such as radar analysis, signal correlation, electronic computers, television systems, etc. The function of the delay line is to provide a predetermined time delay between the reception of a signal at the input side of the delay line and its reproduction at the output side of the line. Delay lines presently in use are generally of the "bulk" type, that is, they comprise rather massive samples of material. Delay lines of this type may suffer certain disadvantages when signals in the megacycle range are to be transmitted through them. One of the more serious disadvantages of bulk type delay lines is that these lines will support many different modes of wave propagation at the higher frequencies, furthermore, all of these so called "higher-order" modes are dispersive, that is, the velocity of the wave varies as a function of frequency. These effects lead to the generation of spurious or unwanted signals in the delay medium which appear at the output of the delay line mixed together with the desired output signal.

It is known that the number of different modes which a delay line can support is proportional to its thickness to wavelength ratio $d/\lambda$, where $d$ is the thickness of the delay medium and $\lambda$ is the wavelength of the waves propagated through the medium. Since $V=f\lambda$, where V is the velocity of the waves through the delay medium and $f$ is their frequency, $d/\lambda=df/V$, where $df/V$ is called the normalized thickness times frequency product. In order to eliminate the higher order, dispersive modes at a given frequency of operation, it is necessary to reduce the thickness of the delay line. However, the practical problem of coupling electromechanical transducers to the delay line has heretofore prevented the use of delay lines of sufficiently small thickness such that the dispersive effects are completely eliminated. The problem becomes especially aggravated if piezoelectric transducers, which have a relatively high electromechanical coupling, are to be used, since it has always been assumed that the dimensions of such transducers had to be scaled down to approximately the end-face dimensions of the sample through which the signals are to be propagated. For this reason, delay lines of the guided wave type using piezoelectric transducers have generally been limited to an upper frequency of the order of a few mc./sec., and in the case of the torsional mode, the practical upper limit has been only about 800 kc./sec.

The same difficulties which have limited the use of delay lines of relatively small thickness or diameter have also operated to retard the examination of such structures by ultrasonic means. It is well known that ultrasonic examination of materials provides much useful information concerning the basic mechanical properties of the material, such as the determination of Young's modulus and other elastic constants. The need for a method of examining structures of relatively small thickness or diameter such as thin films, thin foils, thin fibers and whiskers and the like has become quite great in view of the present electronic technology which utilizes these structures as electronic circuit elements in many applications.

I have found that an improved delay line of relatively narrow dimensions may be formed from thin foils (the term "foils" being used herein to include films and thin plates) or thin fibers (the term "fibers" being used herein to include thin rods, whiskers and wires) of metallic or non-metallic materials in conjunction with electromechanical transducers of conventional size. In particular, I have found that piezoelectric transducers of conventional size may be coupled to thin transmission elements (foils or fibers) without the necessity of scaling the transducers down to the end-face thickness of the transmission elements when high frequency signals are to be propagated through the elements. Briefly, I provide a relatively thin delay medium for the transmission of ultrasonic waves, the medium being loosely mounted or positioned on one or more supports having a relatively high ultrasonic attenuation for the frequencies to be transmitted. Electromechanical transducers are brought into contact with the delay medium in such a fashion as to make a "point" contact with the medium in the case of thin fibers or to make a "line" contact with the medium in the case of thin foils. The delay line so formed is characterized by a relatively low normalized thickness times frequency product (of the order of 0.1 or lower) whereby only the lowest order, non-dispersive modes are propagated through the delay line. In addition to providing a superior delay line, my invention finds ready application to the measurement of the elastic properties of the medium from which the delay line is made.

Accordingly, it is an object of my invention to provide an improved delay line for the transmission of high frequency signals. A further object of my invention is to provide an improved delay line for the transmission of high frequency signals in which only the lowest order, non-dispersive modes are propagated through the line. Another object of my invention is to provide an improved delay line for high frequency signals in which piezoelectric transducers of relatively large dimensions with respect to the contact area between the transducers and the delay line are used. Still another object of my invention is to provide a method of placement of transducers in ultrasonic contact with a delay medium of relatively thin dimensions whereby high frequency signals may readily be transmitted through the delay line. Yet another object of my invention is to provide an improved system for the determination of mechanical properties of a thin foil or fiber by ultrasonic means.

The ultrasonic wave may be transmitted through the delay line of my invention in any of several modes such as the longitudinal (L) mode, the shear (S) mode, or the torsional (T) mode. It is well known that the propagation velocity of an acoustic wave in the shear or torsional modes is approximately half of that in the longitudinal mode. Thus S or T modes are highly desirable if long delays are required as is often the case. Various techniques have been utilized to launch the shear and torsional modes of wave propagation in bulk samples, but these techniques have not been successfully applied to thin foil or thin fiber non-dispersive samples. Further, these techniques have often involved the use of multiple-element transducers to establish the torsional mode in a delay line. I have developed an improved method of coupling electromechanical transducers to a thin fiber delay line whereby mode conversion from shear to torsional occurs at the interface between a single-element shear wave transducer and the delay medium so that a torsional wave is established in the thin fiber medium. Further, I have found that the same coupling method propagates a shear wave if the delay medium is in the form of a thin foil. Accordingly, another object of my invention is to provide an improved shear mode or torsional mode delay line in which the acoustic wave is generated in a thin foil or fiber (respectively) delay medium by means of a piezoelectric shear-type transducer.

Recent developments in the field of optics have demonstrated the utility of bundles of thin fibers of material such as glass, fused silica or quartz for the transmission of light waves from one point to another. I have found that these fiber bundles may readily be converted into a superior delay line which preserves the desirable transmission characteristics of the individual fibers while providing a larger contact area with the standard piezoelectric transducer. Accordingly, another object of my invention is to provide an improved delay line utilizing fiber bundles.

Figure 1B:
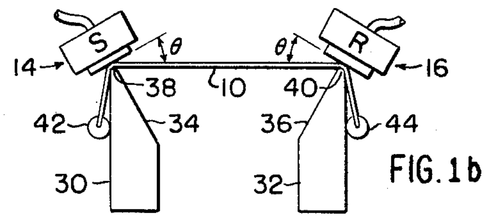
Figure 1C:
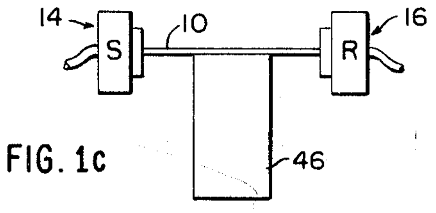
Figure 1D:
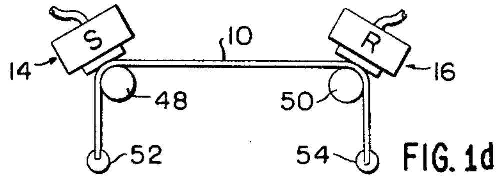
Figure 1E:
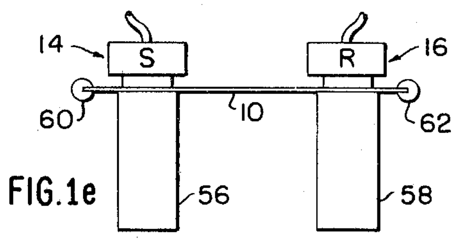
Figure 1F:
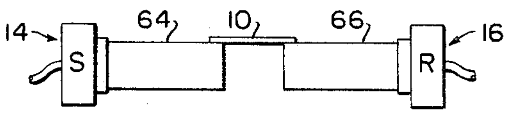
Figure 2:
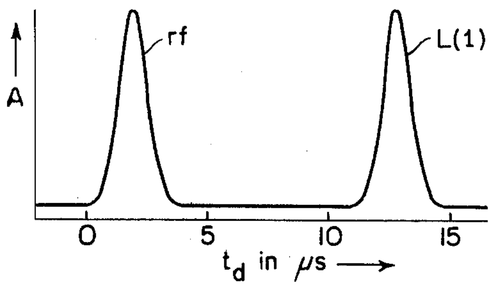
Figures 1G, 3:
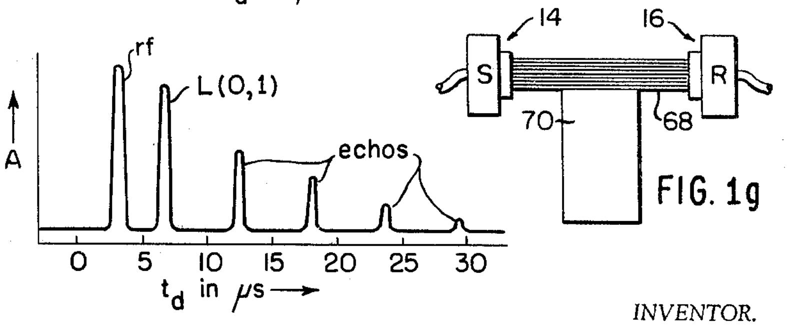

The above and other objects and fe s of my -vention will become more apparent in the following detailed description of a preferred embodiment thereof which has been selected for purposes of illustration and which is shown in the accompanying drawings in which FIGURES 1*a* to 1*g* inclusive are plane side-sectional views wherein S refers to the sender transducer unit and R refers to the receiver transducer unit, and in which:

FIG. 1*a* illustrates a preferred embodiment of my invention showing a fiber or foil delay medium mounted on a pair of upright supports for ultrasonic contact with a pair of electromechanical transducers; this configuration is particularly appropriate for propagating torsional or shear waves;

FIG. 1*b* illustrates another preferred embodiment with a particularly effective means for mounting a thin foil or fiber delay line using absorbent end terminations;

FIG. 1*c* illustrates an alternative method for mounting a fiber type delay line using a single upright support and is particularly appropriate for propagating longitudinal and flexural waves;

FIG. 1*d* illustrates another method of mounting a fiber or foil delay medium on a pair of supports;

FIG. 1*e* illustrates still another method of mounting a delay line on a pair of upright supports and is appropriate for delay lines using thin fibers or foils;

FIG. 1*f* illustrates a method of mounting foils or fibers of extremely thin dimensions;

FIG. 1*g* illustrates a fiber bundle delay medium mounted for ultrasonic propagation;

FIG. 2 illustrates a typical pulse display obtained in conjunction with an ultrasonic wave propagated through a polycrystalline gold film; and FIG. 3 illustrates a typical pulse display obtained when an ultrasonic pulse is propagated through a single crystal fiber of tin dioxide.

Referring now to FIG. 1*a* of the drawings, a delay medium 10 which may comprise a thin foil (including thin plates or films) or a thin fiber (including thin wiskers and wires) is mounted on supports 12 and 13 which are chosen to have a poor acoustic impedance match with the medium 10. In general, a material such as Lucite will be found desirable for this purpose. Positioned adjacent the delay medium 10 are electromechanical transducers 14 and 16 for generating and receiving ultrasonic signals that are propagated through the delay medium. The transducer 14 accepts as an input an electrical signal pulse and converts this pulse, by way of mechanical deformation, into an ultrasonic pulse that is propagated through the medium 10 and received by the transducer 16 which reconverts this signal into electrical form. The transducers 14 and 16 are conventional piezoelectric transducers having active crystals elements 18 and 20 mounted in casings 22 and 24 respectively. Electrical signals are supplied to and taken from the transducers by means of electrical leads 26 and 28, portions of which are shown on the drawings. In particular, electrical input signals are applied to the transducer 14 from a signal source (not shown) via the lead 26, while electrical output signals are taken from the transducer 16 via a lead 28 and supplied to output utilization means (not shown) such as an oscilloscope. The transducers 14 and 16 are each mounted on a precisely aligned fixed support or on a micromanipulator or similar instrument (not shown) in order to provide various degrees of translational and rotational motion to permit positioning the transducer with respect to the delay medium in the desired fashion.

In FIG. 1*a*, the active faces 18 and 20 of the transducers are brought into acoustic contact with the edges of the delay medium 10. The contact area between the delay medium and the active face of the transducer is approximately a "point" of small dimensions when a thin fiber is used as the medium 10. It is found that contacts of this type avoid the generation of spurious modes in the delay medium when high frequency signals are to be transmitted, in contrast to prior type of contacts between transducer and delay medium in which substantially the entire active surface area of the transducer was in contact with the delay medium. With a point type of contact, the electromechanical transducer no longer need be scaled down to match the end-face cross sectional area of the delay medium as the frequency of the waves to be transmitted is increased. Thus the delay lines of my invention may use a delay medium of extremely small thickness (of the order of 1000 angstroms) in order to obtain the lowest order non-dispersive modes of wave propagation even at relatively high frequencies (of the order of 1 to approximately 1000 megacycles/second).

To ensure that substantially the entire transmission between the transducers takes place through the delay medium and not through the supports, the delay medium 10 is rested lightly on the upright supports 12 and 13 and preferably is not mechanically bonded or otherwise joined to the supports. The outer edges of the supports are cut away at an angle to allow the transducer to be positioned at various angles with respect to the plane of the delay medium. It will be understood that if upright supports whose ends are not cut away are used, the delay medium will be extended to the outside edges of these supports in order that the transducer may be brought into contact with the delay medium at various angles when necessary. The configuration of FIGURE 1*a* is particularly useful for launching the lowest order torsional T (0) mode in thin fibers. This mode has the advantage that its velocity of propagation through the delay medium is of the order of one half the velocity of propagation in the longitudinal mode, thus allowing the use of a shorter length of delay line for a given time delay. In this case, the transducers 14 and 16 will be shear-type transducers such as Y-cut quartz; the polarization vector of these transducers will be directed normal to the plane of the drawing. The angle $\theta$ of FIGURE 1*a* may be varied over a range from zero to approximately 10 degrees to suit the particular application. For example, when the configuration of FIGURE 1*a* is being used as a delay line, an angle of $\theta=0°$ will be found to provide a good bond between the transducer and the delay medium. When, however, accurate measurements of group velocity or group delay are desired, an angle of $\theta=2°$ will be found suitable to accurately define the propagation distance in the delay medium. As an example of the results obtainable with my invention, the torsional mode of wave propagation was launched and detected in a fused quartz optical fiber 75 microns in diameter at a frequency of 5 megacycles per second and at a transducer angle of $\theta=2°$. Piezoelectric shear-type transducers were used to launch the torsional wave. It is believed that this is the highest frequency piezoelectrically driven torsional mode delay line constructed so far.

FIGURE 1*b* of the drawings illustrates a method of supporting a delay medium having absorbent terminations and is appropriate for the construction of delay lines utilizing thin foils or thin fibers. The medium 10 is rested on supports 30 and 32 which may be cylindrical or rectangular supports having inner faces 34 and 36 cut at an acute angle to the upper surface of the supports to provide upper knife edges 38 and 40 upon which the delay medium 10 rests. To prevent the supports from cutting through the foil or fiber when the transducers are brought into contact with the delay medium, the upper edges are slightly rounded and polished after being cut. To further reduce this tendency to shear off the ends of the delay medium, thin strips of lens paper (not shown) may be inserted between the delay medium 10 and the supporting knife edges 38 and 40. Opposed ends of the medium 10 are encapsulated in absorbing terminations 42 and 44 respectively to prevent reflection of the pulses from the ends of the medium back to the transducers 14 and 16. The transducers 14 and 16 may be either compressional wave transducers (such as X-cut quartz, lead metaniobate, or PZT-5 transducers) or shear wave transducers such as Y-cut quartz transducers) and are placed in acoustic contact with the medium 10 opposite the edges 38 and 40 at an angle of approximately 45 degrees to launch the longitudinal or shear modes of wave propagation respectively. The contact between the transducers and the medium is a line-type contact for foils or a point-type contact for fibers, the area of this contact being substantially less than the active surface area of the transducer face.

As an example of the results obtained with this type of delay line, the lowest order longitudinal L (1) mode was launched at a frequency of 10 megacycles per second with a piezoelectric compressional wave transducer in a film of polycrystalline gold 9.1 microns thick and 2.52 centimeters in length. An oscillographic display of the input and output pulses of this system is shown in FIGURE 2 where the amplitude of the pulses is plotted against the delay time in microseconds. The first pulse in FIGURE 2 is the radio frequency pulse applied to the transducer 14 in contact with delay medium 10 and the second pulse is the longitudinal mode pulse that has been transmitted through the delay medium and detected by the transducer 16 at the output end of the medium. As will be seen from this figure, the input pulse was reproduced with faithful reproduction and with little or no dispersion. Only the lowest order longitudinal mode was propagated through the polycrystalline gold film. The lowest order SH (0) (shear horizontal) mode was also propagated through a polycrystalline gold film 1.1 microns thick at a frequency of 5 megacycles per second using the configuration of FIGURE 1*b*. The elastic constants of the gold film were determined from the measured wave velocities which were within a fraction of 1% of accepted handbook values as listed in the American Institute of Physics Handbook, 2nd Edition, McGraw-Hill Book Company, 1963. Because of the relatively low thickness times frequency product, only the lowest order modes were propagated through the above films and the input pulse was thus faithfully reproduced at a delayed time interval after its application.

FIGURE 1*c* of the drawings shows a type of support for the delay medium that is particularly appropriate for use with fibers or single crystal whiskers which are capable of providing some measure of self-support. The delay medium 10 may comprise a single fiber of either metallic or non-metallic material. The transducers 14 and 16 are brought into acoustic contact with the delay medium 10 at the ends of the fibers and at an angle approximately ninety degrees to the longitudinal axis of the fiber to form a point-type contact. This type of support is especially suitable for the propagation of longitudinal waves in thin fibers. An example of the results obtained with the configuration of 1*c* may be seen from the following:

A needle shaped semi-conducting whisker of tin dioxide ($SnO_2$) having a diameter of approximately 42 microns was used to propagate the lowest order longitudinal L (0, 1) mode. The input and output pulses obtained are shown in FIGURE 3 which is a plot of the amplitude of the pulses against the delay time in microseconds. The first pulse is the radio frequency input pulse, while the second pulse is the delayed L (0, 1) pulse; the remaining pulses are echoes of the L (0, 1) pulse. A compressional-type piezoelectric transducer was used. A typical delay between echoes of approximately seven microseconds was obtained for a fiber length of 1.57 centimeters.

FIGURE 1*d* shows another mounting arrangement for fiber or foil-type delay lines in which the delay medium 10 is suspended over a pair of rounded supports 48 and 50 to form a slightly extended point or line-type contact. The ends of the medium 10 are encapsulated in absorbent terminations 52 and 54. It will be understood that the supports 48 and 50, terminations 52 and 54, and transducers 14 and 16 are all mounted on a suitable rigid structure (not shown) in order to maintain the parts in precisely fixed relation to one another. Thus the delay line can function in any position independent of gravity. (Similarly, it is understood that any of the other delay line configurations described herein may have their component parts rigidly assembled so that the delay line will function in any mounting position.)

Various types of ultrasonic waves may be launched in the delay medium using the structure shown in FIGURE 1*d*. Thus, for example, the lowest order L (0, 1) mode may be launched by using compressional wave transducers for the transducers 14 and 16 and the lowest order torsional T (0) mode may be launched by using Y-cut quartz shear transducers with the plane of polarization directed normal to the drawing. In some cases, a solid or viscous liquid couplant such as epoxy or glycerin may be used between the transducers and the delay medium to improve the performance of the system. In practice, the thickness of the couplant is adjusted to minimize unwanted responses such as that which may sometimes occur from the lowest flexural mode.

FIGURE 1*e* shows a delay line utilizing a thin fiber from which variable delays may be obtained by repositioning the transducers 14 and 16 and the corresponding supports 56 and 58. As shown in this figure, the delay medium 10 is mounted on a pair of vertical supports 56 and 58 which may be in the form of cylindrical or rectangular supports or some other desired shape. The supports are, of course, formed from material which has a poor acoustic impedance match with the delay medium 10. Shear wave transducers having a polarization vector directed along the fiber axis may be used to establish the lowest order longitudinal L (0, 1) mode in the delay medium. The lowest order torsional T (0) mode may also be established in the medium by utilizing a shear wave transducer whose polarization vector is directed normal to the plane of the drawing. It will be noticed that since the ends of the delay medium extend beyond the transducers 14 and 16, these ends are encapsulated in absorbent terminations to prevent reflections from the end of the medium back to the transducer. The contact between the transducers and the delay medium in this type of delay line is of the line contact type.

FIGURE 1*f* illustrates a useful method of mounting the thin film or fiber when it is of such a nature that it cannot be self-supporting when it is rested on any of the previous supports shown in FIGURES 1*a* through 1*e* of the drawings. As shown in FIGURE 1*f*, electromechanical transducers 14 and 16 are acoustically coupled to the ends of a pair of delay plates 64 and 66 respectively across which is mounted the delay medium 10. In contrast to the previous supports, supports 64 and 66 are chosen to be good acoustic transmitters and to have a good acoustic impedance match with the delay medium 10. Acoustic pulses supplied from the transducer 14 to the support 64 are propagated through the medium 10 and thence through the support 66 to the transducer 16 where the acoustic signal is reconverted into an electrical output signal. The medium 10 may be bonded to the support 64 and 66 if desired. In the case of thin foils and films, the bonding may be accomplished by wetting those portions of the supports 64 and 66 which are to be brought into contact with the foil 10 and allowing the water residue to evaporate, as the sample floats into position. When relatively thin foils are used, this method will provide a strong atomic bond between the foil and the supporting medium. The characteristics of the foil alone can readily be deduced by measuring the characteristics of the foil in combination with the supports and then measuring the characteristics of the supports alone. The supports 64 and 66 in effect form delay plates for the delay medium 10. If the air gap between delay plates 64 and 66 is small enough, the known acoustic velocity in air can be used as a reference velocity for relative measurements on samples.

Up to this point, mounting and transducer coupling techniques have been described only for single foils or fibers. Recent developments of bundles of optical fibers consisting of glass, fused quartz or silica for the transmission of light lead to useful acoustic delay media which can be utilized in accordance with my invention. In particular, a bundle of fibers or foils may be utilized in the configuration shown in FIGURE 1*g* of the drawings which is a side elevational view of a fiber or foil bundle 68 mounted on a pedestal 70 and having ultrasonic transducers 14 and 16 in contact with the end surfaces thereof in a manner similar to that shown in FIG. 1*c* for a single fiber or foil. In some cases it may be found desirable to isolate the individual fiber or foil elements from each other by the interposition of lens paper between the individual elements. Use of a fiber or foil bundle in this configuration offers the advantage that a much larger contact area between the delay medium and the transducer is obtained with consequent ease of handling of the delay medium, while the spurious modes which normally are excited in a solid rod or plate of the same equivalent cross-sectional area are eliminated. If the fiber or foil delay elements in the bundle are of approximately equal length and the bundle is of the flexible type in which the individual elements are fused together only at their ends, an output very similar to that shown in FIGURE 2 is obtained for propagation in the lowest order longitudinal L (0, 1) mode. In effect, the bundle maintains the acoustic characteristics of the individual elements and little or no dispersion is obtained. In contrast, a rigid bundle in which the delay elements are fused together along their entire lengths will exhibit several echoes as well as appreciable dispersion and multiple mode propagation. Characteristics of the latter type of bundle are similar to those of a solid rod of large diameter.

From the above description, various alternatives will suggest themselves to those skilled in the art. Thus, for example, a plurality of acoustic pulses may be generated by a single electromechanical transducer by supplying a plurality of fibers of unequal length in the configuration shown in FIGURE 1*g*, for example. The individual fibers are separated from each other and are all pressed against the active surface of the "transmitting" transducer, thus causing the simultaneous transmission of pulses through all of the fibers at the same time, the shorter fibers being stretched directly between the sending and receiving transducers and the longer fibers being slightly bent or coiled to accommodate themselves to the spacing between the transducers. This results in a delay line which provides a series of accurately spaced output pulses from a single input pulse, the spacing of the pulses being determined by the length of the individual fibers in the delay medium.

Various other modifications will suggest themselves to those skilled in the art without departing from the scope of my invention and it is intended that the material contained in the above description and shown in the accompanying drawings be interpreted as illustrative and not in a limiting sense.

Having described and shown a preferred embodiment of my invention, what I claim as new and desire to secure by Letters Patent is:

1. A delay line for the transmission of ultrasonic waves of given wavelengths at frequencies in excess of 1 mc./sec. comprising, in combination, a pair of upright columns having end faces, a thin foil delay medium resting on said end faces, said medium being characterized by a normalized thickness times frequency product in the order of 0.1 or less and being of substantially the same thickness throughout its extent, a pair of piezoelectric transducers acoustically coupled to said medium intermediate the ends thereof, the active surface areas of said transducers being substantially larger than the contact area between said medium and said transducers, the faces of said transducers being maintained at an angle to the plane of said medium.

2. A delay line for the transmission of ultrasonic waves of given wavelengths at frequencies in excess of 1 mc./sec. comprising, in combination, a delay medium characterized by a normalized thickness times frequency product in the order of 0.1 or less, said medium being of substantially the same thickness throughout its extent, a pair of members over which said medium is passed, the direction of the medium being deflected in passing over each member, a pair of transducers each having an active face in contact with said medium at the point of deflection by a respective one of said members, the active face of each transducer being maintained at an angle to the direction of the medium between said members whereby acoustic waves may be propagated through said medium.

3. A delay line for the transmission of ultrasonic waves of given wavelengths at frequencies in excess of 1 mc./sec. comprising, in combination, a delay medium characterized by a normalized thickness times frequency product in the order of 0.1 or less, said medium being of substantially the same thickness throughout its extent, at least one supporting member on which said medium rests, said member being loosely acoustically coupled to said medium and being of a material having a high acoustic attenuation for the particular wavelengths to be transmitted, a pair of piezoelectric electromechanical transducers acoustically coupled to said medium, the active surface area of said transducers being substantially larger than the contact area between said medium and said transducers, there being a viscous couplant between said transducer and said delay medium, the thickness of said couplant being adjustable to provide an effective area of contact having at least one dimension in the same order as the thickness of said medium so that there is an abrupt change in transverse dimension at the interface between each transducer and said medium, and means for supporting said delay medium between said transducers whereby acoustic signals of preferred mode and wavelength only may be propagated through said medium.

4. A delay line for the transmission of ultrasonic waves of given wavelengths at frequencies in excess of 1 mc./sec. comprising, in combination, a delay medium in the form of a thin fiber characterized by a normalized thickness times frequency product in the order of 0.1 or less, said medium being of substantially the same thickness throughout its extent, a pair of piezoelectric transducers of the shear type acoustically coupled to said medium, the active surface area of said transducers being substantially larger than the contact area between said medium and said transducers, said transducers being brought into contact with said medium to form a point contact therewith with the polarization of said transducers being normal to the longitudinal axis of said fiber, there being an abrupt change in transverse dimension at the interface between each transducer and said medium, and means for supporting said delay medium between said transducers whereby ultrasonic waves in the torsional mode may be generated in said fiber and propagated therethrough.

5. A delay line for the transmission of ultrasonic waves of given wavelengths at frequencies in excess of 1 mc./sec. comprising, in combination, a delay medium in the shape of an extended fiber and characterized by a normalized thickness times frequency product in the order of 0.1 or less, said medium being of substantially the same thickness throughout its extent, a pair of piezoelectric transducers acoustically coupled to said medium, the active surface area of said transducers being substantially larger than the contact area between said medium and said transducers, there being an abrupt change in transverse dimension at the interface between each transducer and said medium, and means for supporting said delay medium between said transducers comprising an upright column having an end face upon which said delay medium rests, the ends of the fiber extending beyond the end face of said column and being in acoustic contact with said transducers whereby said acoustic waves may be propagated through said medium.

6. A delay line for the transmission of ultrasonic waves of given wavelengths at frequencies in excess of 1 mc./sec. comprising, in combination, a delay medium characterized by a normalized thickness times frequency product in the order of 0.1 or less, said medium being of substantially the same thickness throughout its extent, a pair of piezoelectric transducers acoustically coupled to said medium, the active surface area of said transducers being substantially larger than the contact area between said medium and said transducers, there being an abrupt change in transverse dimension at the interface between each transducer and said medium, and means for supporting said delay medium between said transducers comprising a pair of upright columns having end faces on which said delay medium rests, whereby said acoustic waves may be propagated through said medium.

7. The combination defined in claim 6 in which said delay medium is in the shape of an extended fiber, said fiber extending between said columns and resting on the end faces thereof, said transducers being brought into acoustic contact with said fibers at the ends thereof.

8. The combination defined in claim 6 in which said delay medium is in the shape of a thin foil, said foil extending between said columns and resting on the end faces thereof.

References Cited

UNITED STATES PATENTS

| | | | |
|---|---|---|---|
| 2,702,885 | 2/1955 | Shapiro | 333—30 |
| 3,098,204 | 7/1963 | Brauer | 333—30 |
| 3,012,211 | 12/1961 | Mason | 333—30 |
| 3,307,120 | 2/1967 | Denton | 333—30 |
| 3,215,944 | 11/1965 | Matthews | 310—4.6 |
| 3,173,034 | 3/1965 | Dickey | 333—30 |
| 2,503,831 | 4/1950 | Mason | 333—30 |

HERMAN KARL SAALBACH, Primary Examiner

C. BARAFF, Assistant Examiner

U.S. Cl. X.R.

310—8.3; 333—71